US008848290B2

(12) United States Patent
Hull

(10) Patent No.: US 8,848,290 B2
(45) Date of Patent: Sep. 30, 2014

(54) THERMAL WAKE CONTROL

(75) Inventor: David A. Hull, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 201 days.

(21) Appl. No.: 13/082,860

(22) Filed: Apr. 8, 2011

(65) Prior Publication Data
US 2012/0257275 A1 Oct. 11, 2012

(51) Int. Cl.
G02B 27/64 (2006.01)
G02B 7/18 (2006.01)
G02B 23/16 (2006.01)
G02B 17/06 (2006.01)

(52) U.S. Cl.
CPC .............. G02B 23/16 (2013.01); G02B 7/1815 (2013.01); G02B 17/0626 (2013.01)
USPC .......................................... 359/556; 359/399

(58) Field of Classification Search
None
See application file for complete search history.

(56) References Cited

U.S. PATENT DOCUMENTS

| 3,791,713 | A | * | 2/1974 | Mackay | 359/430 |
| 3,942,865 | A | * | 3/1976 | Rand | 359/430 |
| 4,566,432 | A | * | 1/1986 | Sobczak et al. | 126/606 |
| 2006/0018012 | A1 | * | 1/2006 | Smith et al. | 359/366 |

FOREIGN PATENT DOCUMENTS

| JP | 06250102 | 9/1994 |
| JP | 07230043 | 8/1995 |
| JP | 2010039042 | 2/2010 |
| WO | WO 01/65297 A2 | 9/2001 |

OTHER PUBLICATIONS

English Machine Translation of JP-06-250102.*
Extended European Search Report dated Dec. 4, 2012 in connection with European Patent Application No. 12163502.3, 8 pages.

* cited by examiner

Primary Examiner — Derek S Chapel

(57) ABSTRACT

Thermal wake proximate to an optical element of a telescope may be reduced. Signal(s) related to respective temperatures of support struts supporting the optical element may be generated. The respective temperatures of the support struts may be determined based on the signal(s). Individual support struts may be heated based on the respective temperatures of the support struts. Heating a given support strut may cause the given support strut to thermally expand. Individual support struts may be at least partially enclosed with corresponding shrouds. Airspaces may be disposed between individual support struts and the corresponding shrouds. Heat emitted in the airspaces by the support struts may be ejected away from the optical element to prevent a thermal wake from reaching a volume proximate to the optical element.

22 Claims, 7 Drawing Sheets

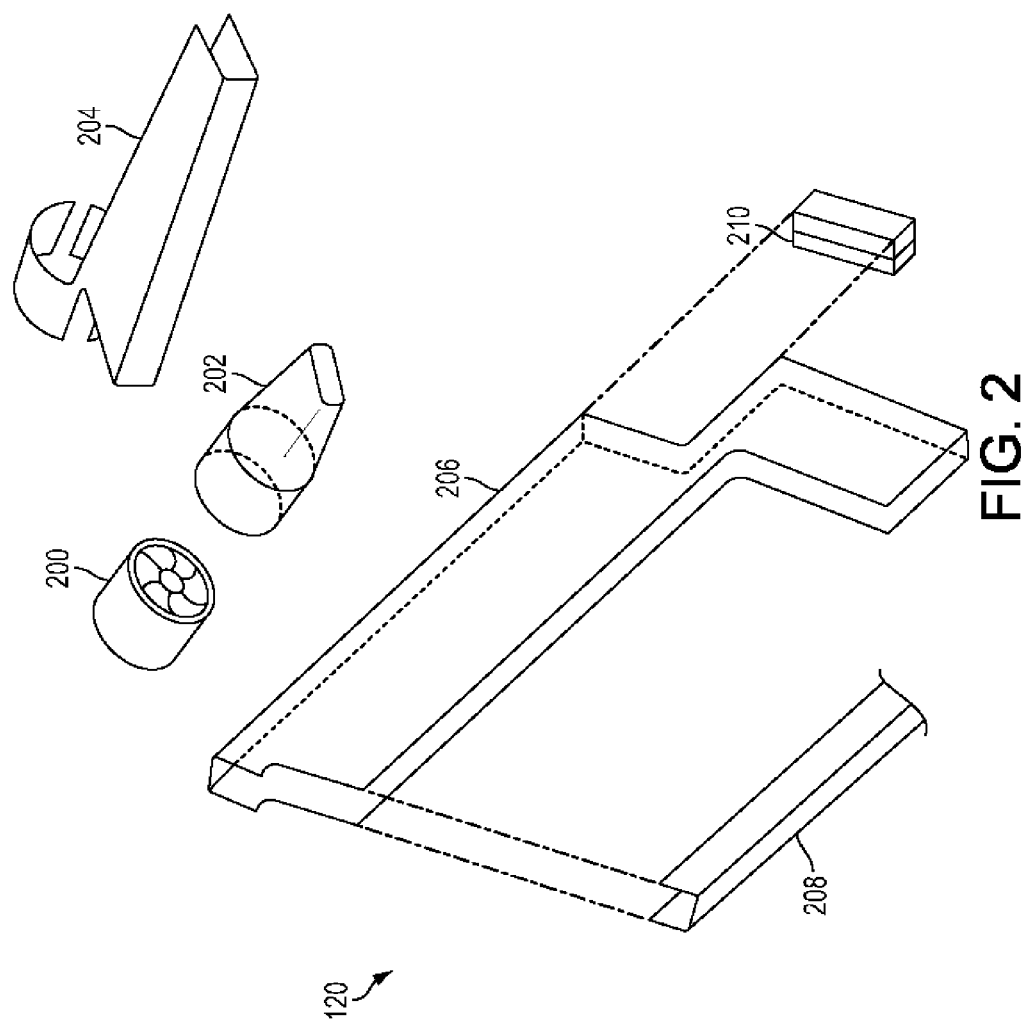

THERMAL WAKE CONTROL

BACKGROUND

This disclosure relates to reducing or eliminating thermal wakes proximate to an optical element of a telescope and/or other optical instrument in which the optical element is positioned by way of thermal control of one or more components supporting the optical element, or by actuation and sensing devices that generate heat during operation.

Conventionally, focusing a telescope via thermal control of one or more support struts or other components supporting an optical element can introduce free-convection thermal wakes (i.e., plumes of differentially heated air) within the optical path of the telescope. These thermal wakes can cause distortion of the optical wavefront and degradation of any resulting imaging or other intended use products. Existing approaches to mitigate such thermal wakes include limiting the total focus travel, and therefore the heat introduced. Further existing approaches include aggressive stirring of the optical cavity air of the telescope to break up the otherwise well-defined thermal wakes. These existing approaches are not suitable for certain applications, such as during optical alignment and in-flight deployments, where in-test difficulties and differences in performance between telescope build, test, sell-off and use may result.

SUMMARY

One aspect of this disclosure relates to a method for reducing thermal wake proximate to an optical element of a telescope. The method may include generating one or more signals related to respective temperatures of one or more support struts supporting the optical element. The method may include determining the respective temperatures of the one or more support struts based on the one or more signals. The method may include heating individual ones of the one or more support struts based on the respective temperatures of the one or more support struts. Heating a given support strut may cause the given support strut to thermally expand. The method may include at least partially enclosing individual ones of the one or more support struts with one or more corresponding shrouds. Airspaces may be disposed between individual ones of the one or more support struts and the one or more corresponding shrouds. The method may include ejecting heat emitted in the airspaces by the one or more support struts away from the optical element to prevent a thermal wake from reaching a volume proximate to the optical element.

Another aspect of this disclosure relates to a positioning apparatus configured to position an optical element of a telescope. The positioning apparatus may include one or more support struts, one or more heating elements, one or more temperature sensors, a controller, one or more shrouds, one or more airflow generation devices, and/or other components. The one or more support struts may each have a first end and a second end. The one or more support struts may be attached by the first ends to the optical element. The one or more support struts may be configured to position the optical element by individually thermally expanding due to heating or thermally contracting due to cooling. The one or more heating elements may be disposed on individual ones of the one or more support struts. The one or more heating elements may be configured to heat individual ones of the one or more support struts. The one or more temperature sensors may be disposed on individual ones of the one or more support struts. The one or more temperature sensors may be configured to generate signals related to respective temperatures of the one or more support struts. The controller may be communicatively coupled with individual ones of the one or more heating elements and communicatively coupled with individual ones of the one or more temperature sensors. The controller may be configured to determine a temperature of individual ones of the one or more support struts based on the signals generated by the corresponding one or more temperature sensors. The controller may be further configured to control a heat output of individual ones of the one or more heating elements to selectively heat the one or more support struts to control a position of the optical element. The one or more shrouds may be disposed so as to at least partially enclose individual ones of the one or more support struts. Airspaces may be disposed between individual ones of the one or more support struts and the corresponding one or more shrouds. The one or more airflow generation devices may be configured to generate airflow in the airspaces disposed between individual ones of the one or more support struts and the corresponding one or more shrouds. The airflow may serve to eject heat emitted by the one or more support struts away from the optical element to prevent a thermal wake from reaching a volume proximate to the optical element.

Yet another aspect of this disclosure relates to a telescope. The telescope may include a telescope enclosure having an input window, an inner housing, a primary mirror, a secondary mirror, a positioning apparatus, and/or other components. The primary mirror may be attached to a first end of the inner housing. The secondary mirror may be attached to a second end of the inner housing by one or more support struts that suspend the secondary mirror between the input window and the primary mirror. The one or more support struts may each have a first end and a second end. The one or more support struts may be attached by the first ends to the secondary mirror and by the second ends to the second end of the inner housing. The one or more support struts may be configured to position the secondary mirror by individually thermally expanding due to heating or thermally contracting due to cooling. The positioning apparatus may be configured to position the secondary mirror. The positioning apparatus may include one or more heating elements, one or more temperature sensors, a controller, one or more shrouds, one or more airflow generation devices, and/or other components. The one or more heating elements may be disposed on individual ones of the one or more support struts. The one or more heating elements may be configured to selectively heat individual ones of the one or more support struts. The one or more temperature sensors may be disposed on individual ones of the one or more support struts. The one or more temperature sensors may be configured to generate signals related to respective temperatures of the one or more support struts. The controller may be communicatively coupled with individual ones of the one or more heating elements and communicatively coupled with individual ones of the one or more temperature sensors. The controller may be configured to determine a temperature of individual ones of the one or more support struts based on the signals generated by the corresponding one or more temperature sensors. The controller may be configured to selectively control a heat output of individual ones of the one or more heating elements to selectively heat the one or more support struts to control a position of the secondary mirror. The one or more shrouds may be disposed so as to at least partially enclose individual ones of the one or more support struts. Airspaces may be disposed between individual ones of the one or more support struts and the corresponding one or more shrouds. The one or more airflow generation devices may be configured to generate airflow in the airspaces disposed between individual ones of the one or more support struts and the corresponding one or more shrouds. The airflow may serve to eject heat emitted by the one or more support struts away from the secondary mirror to prevent a thermal wake from reaching a volume proximate to the secondary mirror.

These and other features and characteristics of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

FIG. 2 illustrates a shroud and other components configured to direct heat away from the optical path of a telescope, in accordance with one or more embodiments;

DETAILED DESCRIPTION

Exemplary embodiments reduce or eliminate thermal wakes and resulting optical distortion, as well as other thermal wake mitigation issues, in telescopes and/or other optical instruments that conventionally arise from positioning an optical element (e.g., a lens, a mirror, an imaging device, and/or other optical elements) by way of thermal control of support strut(s) and/or other component(s) supporting the optical element. More specifically, in some embodiments, a shroud or jacket may be disposed over individual support struts that are heated to control the position of the optical element to create a physical boundary between the support struts and the optical path of the telescope. An airflow may then be introduced to extract heated air surrounding the support struts and eject the heated air away from the optical path of the telescope. As such, heat emitted from the support components is contained and controlled in a way that prevents optical distortion without other negative side effects. It will be appreciated that the description of exemplary embodiments herein is not intended to be limiting as the concepts disclosed herein may be applied to other systems and/or other drive methods. For example, the techniques disclosed herein may be applied to systems that include a piezo-based drive and/or other actuator drive, rather than, or in addition to, the support-strut drives described herein.

Figure 1A:
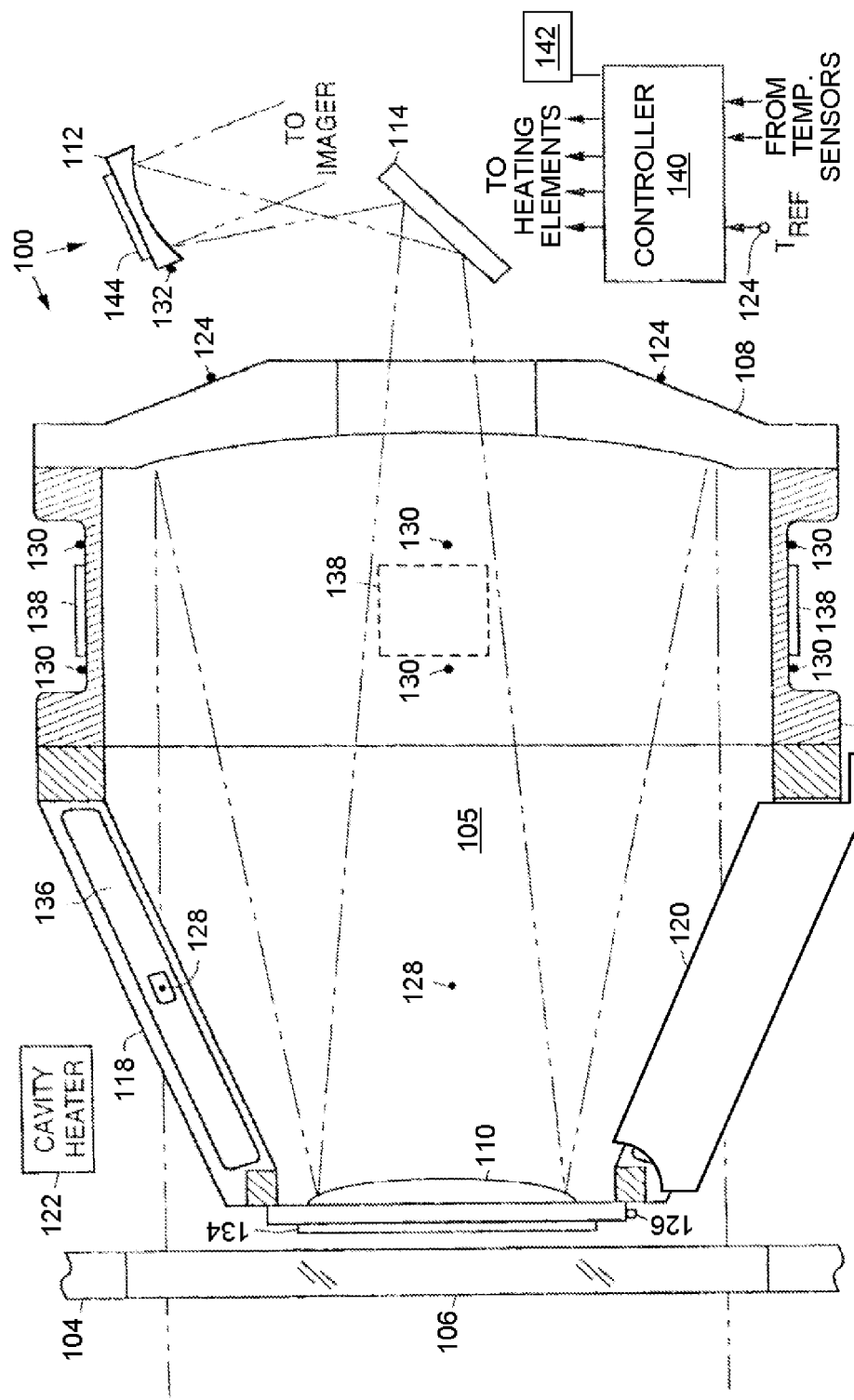
FIG. 1A illustrates a partially cutaway side view of a telescope in which one or more embodiments may be implemented.
Figure 1B:
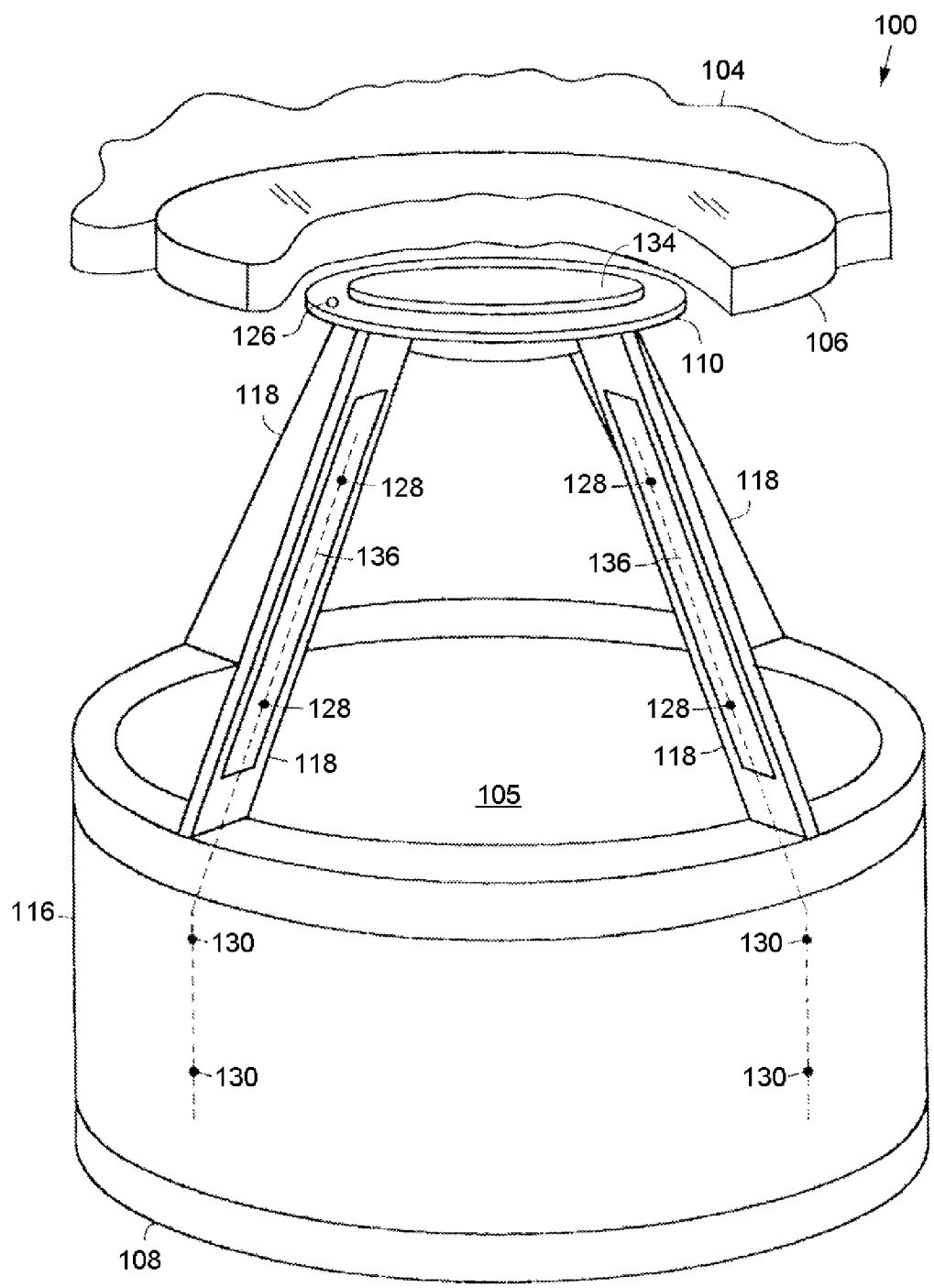
FIG. 1B illustrates a partially cutaway perspective view of the telescope shown in FIG. 1A.
Figure 1C:
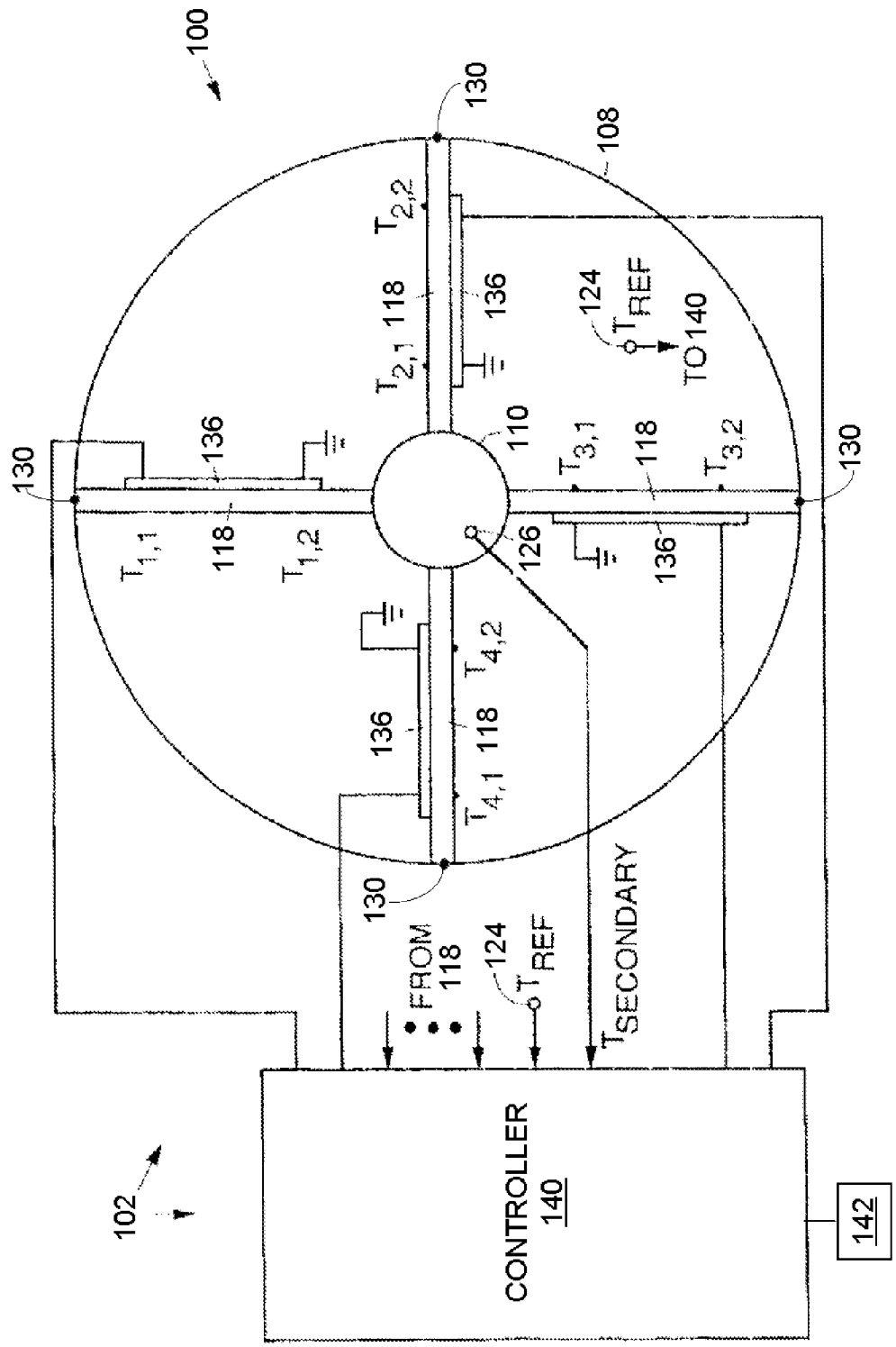
FIG. 1C illustrates details of a positioning apparatus that may be implemented in the telescope shown in FIG. 1A, in accordance with one or more embodiments.
Figure 1D:
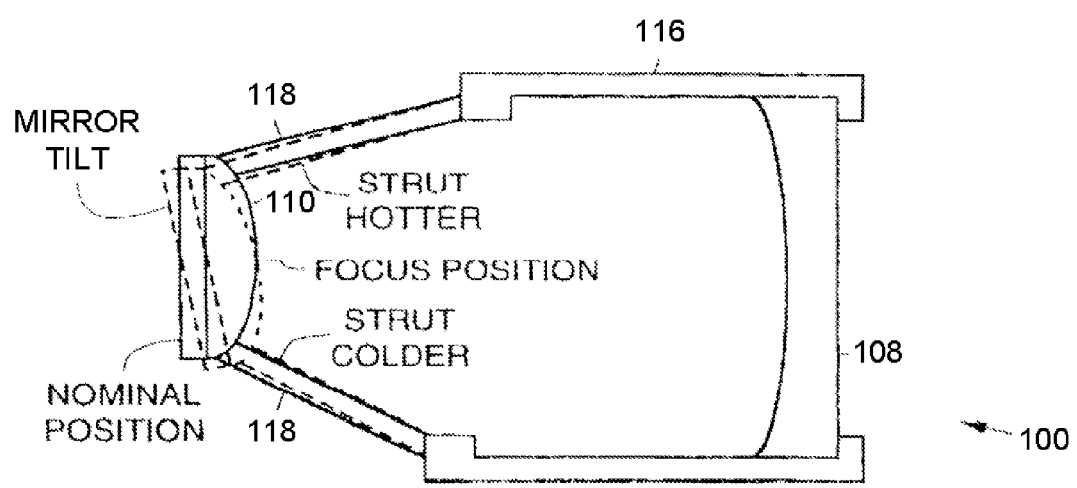
FIG. 1D illustrates boresight correction that may be achieved via one or more embodiments.

Referring now to the figures, FIG. 1A illustrates a partially cutaway side view of telescope 100 in which one or more embodiments may be implemented. It is appreciated that, although telescope 100 is depicted as a centrally-obscured reflective telescope having a three mirror anastigmatic configuration, exemplary embodiments may be implemented in other types of telescopes and other optical instruments. Examples of other types of telescopes in which embodiments can be implemented may include a centrally-obscured reflective telescope having a Cassegrain configuration, an off-axis unobscured telescope, and/or other telescopes in which an optical element is positioned by way of thermal control as described herein. FIG. 1B illustrates a partially cutaway perspective view of telescope 100 shown in FIG. 1A. FIG. 1C illustrates, from a front view of telescope 100 shown in FIG. 1A, details of positioning apparatus 102 that may be implemented in the telescope shown in FIG. 1A, in accordance with one or more embodiments. FIG. 1D illustrates boresight correction that may be achieved via one or more embodiments.

Telescope 100 may include telescope enclosure 104 (a portion of which is shown) having internal cavity 105 and input window 106. In some embodiments, telescope enclosure 104 may be insulated. As depicted in FIG. 1A, telescope 100 may include one or more mirrors. Examples of such one or more mirrors may include primary mirror 108, secondary mirror 110, tertiary mirror 112, flat fold mirror 114, and/or other mirrors. One or more mirrors included in telescope 100 may be powered. Inner housing 116, which may be referred to as a barrel, may have support struts 118 secured to one end of inner housing 116. Inner housing 116 may be secured to primary mirror 108 at another end of inner housing 116. Secondary mirror 110 may be suspended between input window 106 and primary mirror 108 by means of a plurality of support struts 118. Each individual support strut 118 may be at least partially enclosed by shroud 120. For illustrative purposes, only one support strut 118 is depicted in FIG. 1A as being at least partially enclosed by shroud 120. It is appreciated, however, that one or more of support struts 118 may be at least partially enclosed by one or more corresponding shrouds 120. Shrouds 120 are described further in connection with FIGS. 2 and 3. The above-mentioned optical components may be disposed within cavity 105 of telescope enclosure 104 or on an optical bench (not shown). Cavity heater 122 may be provided in cavity 105 for heating the interior of cavity 105.

In some embodiments, telescope 100 may be mated to focusing optics, such as, for example, an imager (generally shown in FIG. 1A). Examples of such an imager may include reflective imaging optics comprising one or more mirrors and/or refractive imaging optics comprising one or more lenses. The images formed by the telescope and imaging optics may be exploited by an analog camera, a digital camera, a charge-coupled device (CCD), CMOS, infrared detectors, and/or other devices configured for optical imaging. Flat fold mirror 114 may be used to improve packaging of telescope 100 by allowing reflected light from secondary mirror 110 onto tertiary mirror 112, which may couple light to focusing optics and/or the imager.

One or more first temperature sensors 124 may be disposed on primary mirror 108. First temperature sensors 124 may generate a signal related to a reference temperature ($T_{REF}$). One or more second temperature sensors 126 may be disposed on secondary mirror 110. One or more third temperature sensors 128 may be disposed on support struts 118. One or more fourth temperature sensors 130 may be disposed around the periphery of inner housing 116. In some embodiments, forth temperature sensors 130 may be located in respective quadrants of inner housing 116. One or more temperature sensors 132 may be disposed on tertiary mirror 112. The temperature sensors 124, 126, 128, 130, and/or 132 may include thermistors and/or other devices configured to sense temperature. According to some embodiments, one or more third temperature sensors 128 may be disposed on individual support struts 118 such that the one or more third temperature sensors 128 are aligned with fourth temperature sensors 130 disposed on the inner housing 116.

In accordance with exemplary embodiments, temperature sensors 126, 124, and 132 may be disposed, respectively, on primary mirror 108, secondary mirror 110, and tertiary mirror 112. The curvature of one or more of primary mirror 108, secondary mirror 110, tertiary mirror 112, and/or other mirror may be sensitive to temperature. The curvature of one or more of primary mirror 108, secondary mirror 110, tertiary mirror 112, and/or other mirror may be corrected by mathematically predicting curvature as a function of temperature and controlling the respective temperatures of primary mirror 108, secondary mirror 110, tertiary mirror 112, and/or other mirror. Second temperature sensors 124 may be disposed on primary mirror 108 and may generate a signal related to the reference temperature ($T_{REF}$).

Secondary mirror heating element 134 may be disposed on secondary mirror 110. Secondary mirror heating element 134 may be used to control the curvature of secondary mirror 110. One or more support strut heating elements 136 may be disposed on individual support struts 118. Support strut heating elements 136 may be used to control the relative lengths of respective support struts 118. That is, support struts 118 may be configured to thermally expand due to heating and thermally contract due to cooling. Support struts 118 may be formed at least in part by A356 or A357 cast aluminum, and/or other materials having suitable thermal expansion characteristics. One or more strip heating elements 138 may be disposed around the periphery of inner housing 116. According to some embodiments, strip heating elements 138 may be disposed in respective quadrants of inner housing 116. Cavity heater 122 may be used to heat the interior of cavity 105 and/or other components of telescope 100. In such embodiments, strip heating elements 138 on the inner housing 116, primary mirror 108, secondary mirror 110, and/or other components of telescope 100 may be omitted. Fourth temperature sensors 130 may be disposed on an unheated structure (e.g., inner housing 116). In one embodiment, for example, eight or more fourth temperature sensors 130 may be disposed on inner housing 116. The various heating elements may be secured to the their respective components using an adhesive film and/or other connective mechanism. According to some embodiments, support strut heating elements 136, strip heating elements 138, and/or cavity heater 122 may include a resistive element, a printed/etched circuit heater and/or other foil-type heater, wound-wire heater, indirect heater (e.g., convective heater), radiative heater, and/or other device configured to provide heat energy.

Positioning apparatus 102 may include controller 140. Controller 140 may be communicatively coupled to electronic storage medium 142, which is described further below. Controller 140 may be configured to provide information processing capabilities in telescope 100. As such, controller 140 may include one or more of a digital processor, an analog processor, a digital circuit designed to process information, an analog circuit designed to process information, a state machine, and/or other mechanisms for electronically processing information. Although controller 140 is shown in FIG. 1 as a single entity, this is for illustrative purposes only. In some implementations, controller 140 may include a plurality of processing units. These processing units may be physically located within the same device or computing platform, or controller 140 may represent processing functionality of a plurality of devices operating in coordination. Controller 140 may be configured to execute computer program modules, algorithms, instructions, and/or other executable information.

Controller 140 may be communicatively coupled to one or more temperature sensors and/or one or more heating elements that are respectively disposed on various components of telescope 100. Controller 140 may determine temperatures of one or more of support struts 118, inner housing 116, primary mirror 108, secondary mirror 110, tertiary mirror 112, and/or other components based on signals received from one or more temperature sensors (e.g., temperature sensors 124, 126, 128, 130, and/or 132). Support struts 118 that support secondary mirror 110 may be heated by corresponding support strut heating elements 136. Support strut heating elements 136 may be controlled by controller 140 in order to control the position (e.g., focus and/or boresight) of secondary mirror 110 using servo-type control. Support strut heating elements 136 may be tailored to expected temperature gradients and may be shielded from the optical path of telescope 100. Controller 140 may provide selective control of the temperature of one or more of support struts 118, inner housing 116, primary mirror 108, secondary mirror 110, tertiary mirror 112, and/or other components. In some embodiments, controller 140 may control temperatures via closed loop feedback control. In some embodiments, controller 140 may control one or more of support strut heating elements 136, strip heating elements 138, and/or mirror heating elements 134 and/or 144 in an analog (hardwired) fashion. Heating elements 134, 136, 138, and/or 144 may be software controlled, in accordance with some embodiments. Controlling temperatures of various components may control focus and/or thermal characteristics of telescope 100.

The temperatures sensed by temperature sensors 124, 126, 128, 130, and/or 132 may be instantaneous and autonomous in that, as positioning apparatus 102 operates, the temperatures may be subject to thermal transient such as turn-on, solar load, active components mounted in close proximity, local air temperature, and/or other conditions. In some embodiments, controller 140 may operate with a given sample frequency. In such embodiments, support struts 118 may be continuously commanded to refocus and the curvature of secondary mirror 110 may be adjusted to provide the correct curvature.

Signal(s) generated by temperature sensors 124, 126, 128, 130, and/or 132 may be mapped into a focus algorithm employed in controller 140. Such a focus algorithm may utilize analysis of the growth of telescope 100 due to temperature gradients. Signal(s) relating to active corrections may be input from temperature sensors 124, 126, 128, 130, and/or 132.

One or more temperature sensors 124 may be disposed on primary mirror 108. Primary mirror 108 may have the highest sensitivity (defocus/° C.) relative to other mirrors of telescope 100. The temperature of primary mirror 108 may be used as a first correction term (e.g., reference temperature, $T_{REF}$) in a calculation performed by a focusing algorithm executed by controller 140. Signals generated by temperature sensors 124 may be averaged, in some embodiments. Secondary mirror heating element 134 may be installed on secondary mirror 110, according to some embodiments. Secondary mirror heating element 134 may be used to provide an additional correction term (e.g., secondary reference temperature, $T_{SECONDARY}$) for a focus algorithm executed by controller 140.

As mentioned above, FIG. 1D illustrates boresight correction that may be achieved via one or more embodiments. The nominal positions, according to one or more embodiments, of support struts 118 and secondary mirror 110 are shown in solid lines. The adjusted (compensated) positions, in accordance with exemplary embodiments, of support struts 118 and secondary mirror 110 are shown in dashed lines. By using controller 140 to adjust the respective temperatures provided by support strut heating elements 136 coupled to support struts 118, for example, the respective lengths of support struts 118 may be controlled to correct the boresight of telescope 100.

When support struts 118 are used to correct a thermal gradient in telescope 100, support struts 118 may simultaneously correct both focus and boresight. In some embodiments, support struts 118 may be heated slightly above the temperature of the remaining components of telescope 100. When one side of support struts 118 are allowed to cool and the other side is heated, a boresight shift may be induced, such as is illustrated in FIG. 1D. By controlling the temperature of support struts 118 in an appropriate way, full X/Y tilting of secondary mirror 110 may be achieved. This may be done by way of open loop feedback (e.g., fixed offsets in the software command) and/or by using feedback from another alignment references.

FIG. 2 illustrates shroud 120 and other components configured to direct heat away from the optical path of telescope 100, in accordance with one or more embodiments. In addition to shroud 120, FIG. 2 illustrates airflow generation device 200, transition apparatus 202, and an alternate view 204 of shroud 120. An exemplary assembly configuration of one or more components shown in FIG. 2 is described in connection with FIG. 3.

Shroud 120 may be disposed so as to at least partially enclose an individual support strut 118. Shroud 120 may include shroud housing 206, shroud cap 208, and/or other components. Shroud housing 206 and shroud cap 208 may fit together around a support strut 118. In some embodiments, shroud 120 may be configured to block a line-of-sight between secondary mirror 110 (and/or other components of telescope 100) and the corresponding support strut 118. Shroud 120 may be formed of materials that are readily fabricated in thin thicknesses with moderately complex shapes and low thermal conductivity. Examples of such materials may include a plastic, fiber reinforced plastic (FRP), fiberglass (e.g., G10), carbon composites, and/or other suitable materials. One or more seals 210 may be fitted between shroud 120 and support strut 118. Seals 210 may be configured to confine heat emitted by support strut 118 within shroud 120 and/or other components configured to direct heat away from the optical path of telescope 100. Seals 210 may be configured to provide vibrational damping to isolate mechanical vibrations that may be caused by airflow generation device 200.

Airflow generation device 200 may be configured to generate airflow in an airspace disposed between one of support struts 118 and the corresponding shroud 120. Such airflow may serve to eject heat emitted by support strut 118 away from input beam bundle shown in FIG. 1A to prevent a thermal wake within the optical path. According to various embodiments, airflow generation device 200 may include an axial fan, a centrifugal fan, cross-flow fan, a bladeless fan, vacuum pump, and/or other devices configured to generate airflow. Shroud housing 206 may be configured to secure airflow generation device 200 in position relative to shroud 120.

Transition apparatus 202 may be configured to couple airflow generation device 200 to an exhaust duct configured to vent the ejected heat away from an optical path of the telescope. In some embodiments, transition apparatus 202 may be formed by a shrink sleeving and/or other material or apparatus suitable to couple airflow generation device 200 to an exhaust duct. Transition apparatus 202 may be coupled to airflow generation device 200 by way of bonding, gluing, press-fitting, and/or other mechanical coupling approach.

Figure 3:
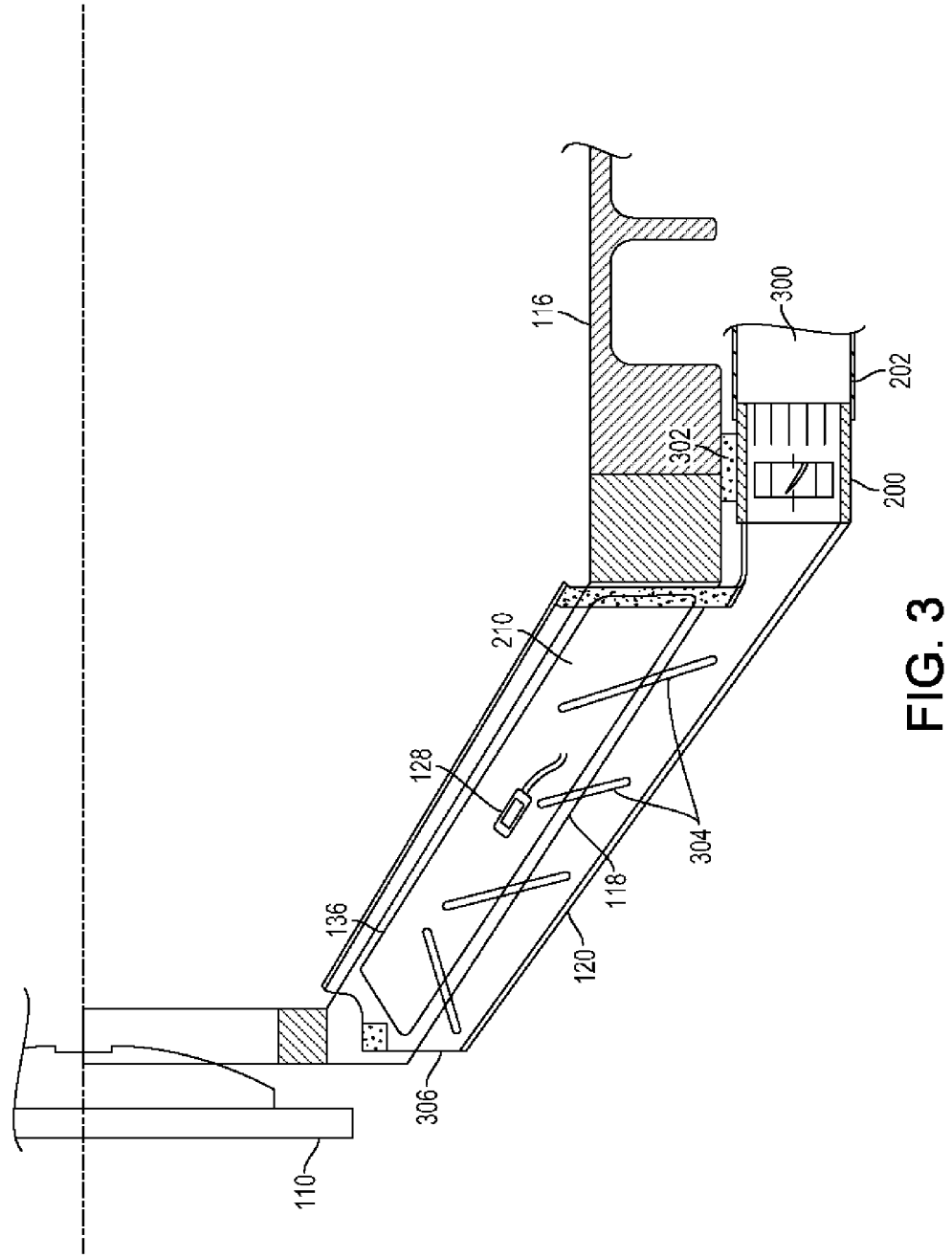
FIG. 3 illustrates an exemplary configuration of a shroud and other components within a telescope, in accordance with one or more embodiments.

FIG. 3 illustrates an exemplary configuration of shroud 120 and other components within telescope 100, in accordance with one or more embodiments. As depicted in FIG. 3, support strut 118 may be attached at one end to secondary mirror 110 and attached at another end to inner housing 116. Shroud 120 may be disposed so as to at least partially enclose support strut 118. As such, an airspace may be disposed between support strut 118 and shroud 120. Support strut heating element 136 may be disposed on support strut 118 and may heat support strut 118 under selective control of controller 140 to cause support strut 118 to lengthen due to thermal expansion. Third temperature sensor 128 may be disposed on support strut 118 and may generate a signal related to the temperature of support strut 118. That signal may be utilized by controller 140 to determine whether to heat support strut 118 via support strut heating element 136. Airflow generation device 200 is disposed at the inner-housing end of support strut 118 in order to generate airflow in the airspace disposed between support strut 118 and shroud 120. The airflow may serve to eject heated gas (e.g., air) generated by support strut 118 away from input beam bundle to prevent a thermal wake within the optical path. Transition apparatus 202 may be attached to airflow generation device 200 to couple the airflow to exhaust duct 300, which may vent the ejected heat away from the optical path of telescope 100. Seal 210 may be disposed between shroud 120 and support strut 118 to confine heat within shroud 120 so the heat may be efficiently ejected by airflow generation device 200. Vibrational damping element 302 and/or seal 210 may be configured to provide vibrational damping to isolate mechanical vibrations that may be caused by airflow generation device 200. In some embodiments, shroud 120 may include flow control vanes 304 configured to control airflow within shroud 120. Cooling air inlet 306 may introduce air from the interior of cavity 105 to the airspace within shroud 120.

Figure 4:
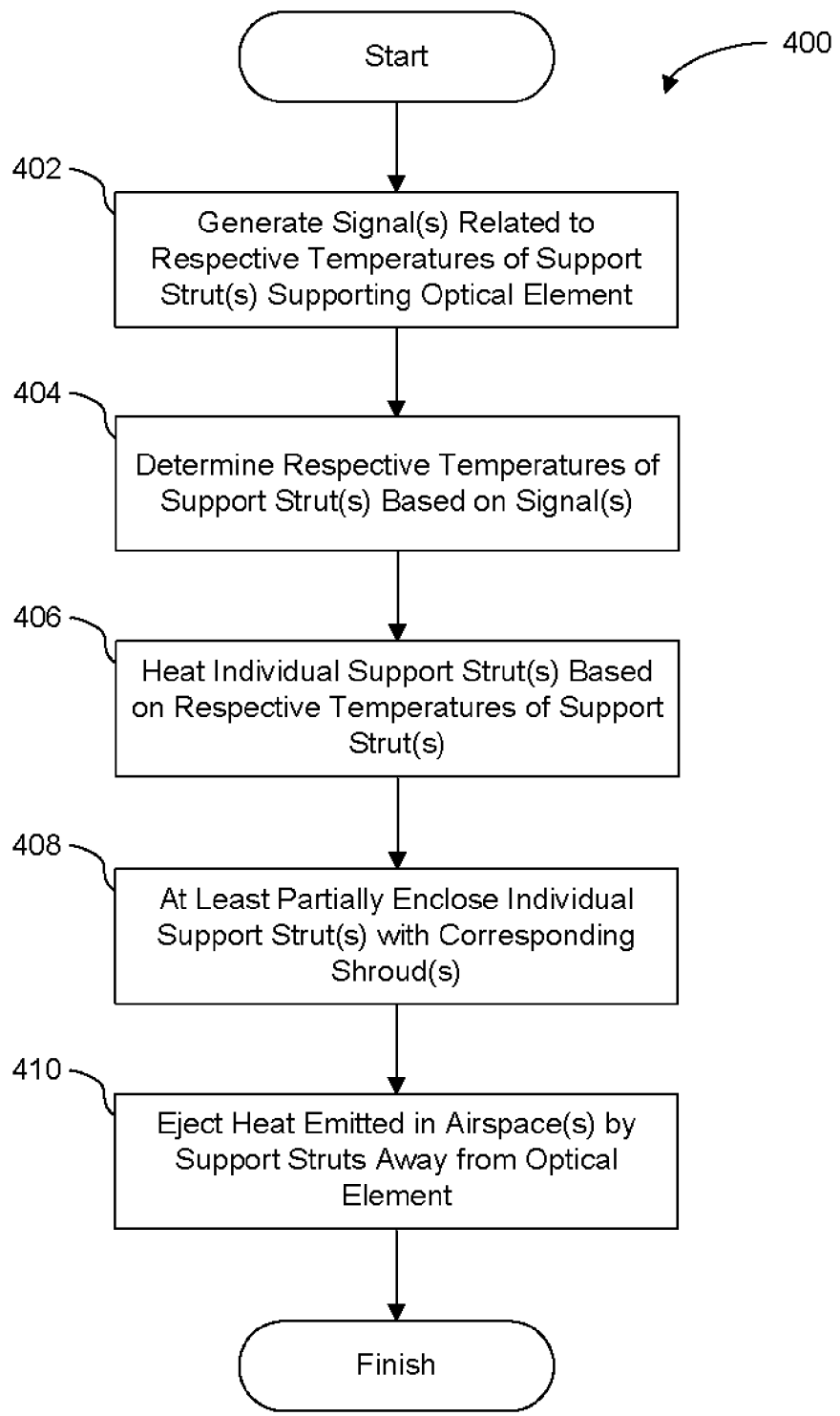
FIG. 4 is a flow chart illustrating a method for reducing thermal wake within an optical path of a telescope, in accordance with one or more embodiments.

FIG. 4 is a flow chart illustrating a method 400 for reducing thermal wake within an optical path of a telescope, in accordance with one or more embodiments. The operations of the method 400 presented below are intended to be illustrative. In some implementations, the method 400 may be accomplished with one or more additional operations not described, and/or without one or more of the operations discussed. Additionally, the order in which the operations of the method 400 are illustrated in FIG. 4 and described below is not intended to be limiting.

In some implementations, one or more operations of the method 400 may be implemented in one or more processing devices (e.g., a controller, a digital processor, an analog processor, a digital circuit designed to process information, an analog circuit designed to process information, a state machine, and/or other mechanisms for electronically processing information). The one or more processing devices may include one or more devices configured through hardware, firmware, and/or software to be specifically designed for execution of one or more of the operations of the method 400. The one or more processing devices may include one or more devices executing some or all of the operations of the method 400 in response to instructions stored electronically on electronic storage medium 142. Generally speaking, electronic storage media may include system storage that is provided integrally (i.e., substantially non-removable) with telescope 100 and/or removable storage that is removably connectable to telescope 100 via, for example, a port (e.g., a USB port, a firewire port, etc.) or a drive (e.g., a disk drive, etc.). Electronic storage media may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage media may store software algorithms, information determined by controller 140, and/or other information that enables telescope to function as described herein.

At operation 402, one or more signals related to respective temperatures of one or more support struts supporting an optical element are generated. According to some embodiments, such signal(s) may be generated by one or more of third temperature sensors 128 disposed on support struts 118. The optical element may include secondary mirror 110. In some embodiments, the optical element may include a lens, a mirror, an imaging device, and/or other optical elements.

At operation 404, the respective temperatures of the one or more support struts are determined based on the one or more signals. In exemplary embodiments, controller 140 may determine a temperature of each individual support strut 118 based on signals generated by third temperature sensors 128 disposed on the support struts 118.

At operation 406, individual ones of the one or more support struts are heated based on the respective temperatures of the one or more support struts. Heating a given support strut may cause the given support strut to thermally expand. Ceasing to heat a given support strut that was previously heated may cause the given support strut to thermally contract. In accordance with some embodiments, controller 140 may control a heat output of each individual support strut heating element 136 to selectively heat support struts 118, thus controlling a position of secondary mirror 110 and/or other optical elements.

At operation 408, individual ones of the one or more support struts are at least partially enclosed with one or more corresponding shrouds. Airspaces may be disposed between individual ones of the one or more support struts and the one or more corresponding shrouds. In some embodiments, shrouds 120 may be disposed so as to at least partially enclose each individual support strut 118 such that airspaces are disposed between each individual support strut 118 and the corresponding shroud 120.

At operation 410, heat emitted in the airspaces by the one or more support struts is ejected away from the optical element to prevent a thermal wake from reaching a volume proximate to the optical element. According to some embodiments, one or more airflow generation devices 200 may generate airflow in the airspaces disposed between individual ones of support struts 118 and the corresponding shrouds 120 such that heat emitted by support struts 118 is ejected away from secondary mirror 110 and/or other optical elements.

Although various embodiments have been described in detail for the purpose of illustration based on what is currently considered to be the most practical implementation, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that disclosure contemplates that, to the extent possible, one or more features of any embodiment can be combined with one or more features of any other embodiment.

What is claimed is:

1. A method for reducing thermal wake proximate to an optical element of a telescope, the method comprising:
generating signals related to respective temperatures of support struts supporting the optical element, each support strut having a corresponding heating element;
determining the respective temperatures of the support struts based on the signals;
heating, with at least one of the heating elements, one or more of the support struts based on the temperatures of the support struts, wherein heating a given support strut causes the given support strut to thermally expand, wherein each of the support struts is at least partially enclosed along with the corresponding heating element by a corresponding shroud, and wherein airspaces are disposed between the support struts and the corresponding shrouds; and
ejecting heat in the airspaces from the heating elements away from the optical element to prevent a thermal wake from reaching a volume proximate to the optical element, wherein ejecting the heat includes generating airflows in the airspaces disposed between the support struts and the corresponding shrouds using airflow generation devices;
wherein, for each airflow generation device, a transition apparatus is coupled to an output of the airflow generation device and to an exhaust duct, the transition apparatus having a larger opening coupled to the output of the airflow generation device and a narrower opening coupled to the exhaust duct.

2. The method of claim 1, wherein the telescope is a centrally-obscured reflective telescope.

3. The method of claim 1, further comprising blocking a line-of-sight between the optical element and the support struts using the shrouds.

4. The method of claim 1, further comprising venting the ejected heat away from an optical path of the telescope.

5. The method of claim 1, further comprising damping mechanical vibrations caused by the airflow generation devices.

6. The method of claim 1, further comprising:
heating another portion of the telescope with at least one additional heating element, the at least one additional heating element not surrounded by a shroud.

7. The method of claim 1, wherein each of at least one of the shrouds has one or more flow control vanes configured to control an airflow in that shroud.

8. A positioning apparatus configured to position an optical element of a telescope, the positioning apparatus comprising:
support struts configured to position the optical element, each support strut having a first end and a second end, the support struts attached by the first ends to the optical element, each support strut configured to thermally expand due to heating or thermally contract due to cooling;
heating elements configured to heat the support struts;
temperature sensors configured to generate signals related to respective temperatures of the support struts;
a controller configured to determine the respective temperatures of the support struts based on the signals generated by the temperature sensors, the controller further configured to control a heat output of each heating element to selectively heat the support struts to control a position of the optical element;

shrouds at least partially enclosing the support struts along with the corresponding heating elements, wherein airspaces are disposed between the support struts and the corresponding shrouds;

airflow generation devices associated with the shrouds, the airflow generation devices configured to generate airflows in the airspaces disposed between the support struts and the corresponding shrouds in order to eject heat from the heating elements away from the optical element to prevent a thermal wake from reaching a volume proximate to the optical element; and for each airflow generation device, a transition apparatus coupled to an output of the airflow generation device and to an exhaust duct, the transition apparatus having a larger opening coupled to the output of the airflow generation device and a narrower opening coupled to the exhaust duct.

9. The positioning apparatus of claim 8, wherein the telescope is a centrally-obscured reflective telescope.

10. The positioning apparatus of claim 8, wherein the shrouds are configured to block a line-of-sight between the optical element and the support struts.

11. The positioning apparatus of claim 8, further comprising the exhaust duct, the exhaust duct configured to vent the ejected heat away from an optical path of the telescope.

12. The positioning apparatus of claim 8, wherein the airflow generation devices include fans.

13. The positioning apparatus of claim 8, wherein the airflow generation devices are disposed proximate to the second ends of the support struts.

14. The positioning apparatus of claim 8, further comprising at least one damping apparatus configured to damp mechanical vibrations caused by the airflow generation devices.

15. The positioning apparatus of claim 8, further comprising at least one additional heating element configured to heat a portion of the telescope, the at least one additional heating element not surrounded by a shroud.

16. The positioning apparatus of claim 8, wherein each of at least one of the shrouds has one or more flow control vanes configured to control the airflow in that shroud.

17. A telescope comprising:
a telescope enclosure having an input window;
an inner housing;
a primary mirror attached to a first end of the inner housing;
a secondary mirror attached to a second end of the inner housing by support struts that suspend the secondary mirror between the input window and the primary mirror, the support struts configured to position the secondary mirror and each having a first end and a second end, the support struts attached by the first ends to the secondary mirror and by the second ends to the second end of the inner housing, each support strut configured to thermally expand due to heating or thermally contract due to cooling; and a positioning apparatus configured to position the secondary mirror, the positioning apparatus comprising:
heating elements configured to heat the support struts;
temperature sensors configured to generate signals related to respective temperatures of the support struts;
a controller configured to determine the respective temperatures of the support struts based on the signals generated by the temperature sensors, the controller further configured to control a heat output of each heating element to selectively heat the support struts to control a position of the secondary mirror;
shrouds at least partially enclosing the support struts along with the corresponding heating elements, wherein airspaces are disposed between the support struts and the corresponding shrouds;
airflow generation devices associated with the shrouds, the airflow generation devices configured to generate airflows in the airspaces disposed between the support struts and the corresponding shrouds in order to eject heat from the heating elements away from the secondary mirror to prevent a thermal wake from reaching a volume proximate to the secondary mirror; and
for each airflow generation device, a transition apparatus coupled to an output of the airflow generation device and to an exhaust duct, the transition apparatus having a larger opening coupled to the output of the airflow generation device and a narrower opening coupled to the exhaust duct.

18. The telescope of claim 17, further comprising the exhaust duct, the exhaust duct configured to vent the ejected heat away from an optical path of the telescope.

19. The telescope of claim 17, wherein the airflow generation devices are disposed proximate to the second ends of the support struts.

20. The telescope of claim 17, further comprising at least one damping apparatus configured to damp mechanical vibrations caused by the airflow generation devices.

21. The telescope of claim 17, further comprising at least one additional heating element configured to heat a portion of the telescope, the at least one additional heating element not surrounded by a shroud.

22. The telescope of claim 17, wherein each of at least one of the shrouds has one or more flow control vanes configured to control an airflow in that shroud.

* * * * *